United States Patent [19]

D'Amours

[11] Patent Number: 5,036,802

[45] Date of Patent: Aug. 6, 1991

[54] REVERSE ROTATION ENGINE

[75] Inventor: Albert D'Amours, Valcourt, Canada

[73] Assignee: Bombardier Inc., Canada

[21] Appl. No.: 612,465

[22] Filed: Nov. 14, 1990

[30] Foreign Application Priority Data

Mar. 13, 1990 [CA] Canada .................................. 2012027

[51] Int. Cl.[5] ............................................ F01L 13/02
[52] U.S. Cl. ................................. 123/41 E; 123/65 R
[58] Field of Search ................. 123/41 R, 41 E, 65 R, 123/602, 625

[56] References Cited

U.S. PATENT DOCUMENTS

| | | | |
|---|---|---|---|
| 2,881,744 | 4/1959 | Fox | 123/41 R |
| 3,088,445 | 5/1963 | Gardner | 123/41 R |
| 3,189,009 | 6/1965 | Andersen | 123/41 E |
| 3,554,179 | 6/1969 | Burson | 123/149 A |
| 3,739,759 | 6/1973 | Sleder | 123/149 D |
| 3,981,278 | 9/1976 | Harada | 123/41 R |
| 3,981,278 | 9/1976 | Harada | 123/41 R |
| 4,038,825 | 8/1977 | Bastenhof et al. | 123/41 R |
| 4,184,462 | 1/1980 | Hale | 123/65 EM |
| 4,583,498 | 4/1986 | Magnet | 123/41 R |
| 4,651,705 | 3/1987 | Kinoshita | 123/602 |
| 4,819,594 | 4/1989 | Tsakiroglou | 123/201 |

FOREIGN PATENT DOCUMENTS 234069 9/1923 Canada .
594571 3/1960 Canada .
624450 7/1961 Canada .

*Primary Examiner*—David A. Okonsky
*Attorney, Agent, or Firm*—Larson and Taylor

[57] ABSTRACT

A reversing internal combustion engine has an ignition system controlled by a microprocessor which samples the magneto voltage output in order to make decisions concerning spark/timing. By suppressing the spark to allow the engine to slow down, and reapplying the spark at a suitable advance, reversal of the engine is effected from forward to reverse or reverse to forward.

30 Claims, 2 Drawing Sheets

REVERSE ROTATION ENGINE

BACKGROUND OF THE INVENTION

This invention relates to reversible internal combustion engines.

In many situations where internal combustion engines having a reverse gear are used, it would be a distinct advantage if the engine were capable of reverse rotation, thereby obviating the need for the reverse gear. Such an engine would provide a mechanically simpler and more economically functioning apparatus. Examples of such applications would be in snowmobiles for instance, where it is currently necessary to provide a reverse gear if the snowmobile is to be capable of being backed up. In such an application, it would also be highly desirable that the direction of rotation of the engine be automatically reversible at the touch of a switch, rather than requiring the engine to be stopped and mechanical energy be applied directly to the engine by a starter motor or by the operator through a starter pulley.

Presently available geared systems for reverse drive of snowmobiles are cumbersome and expensive and as a consequence are provided only on high end and on heavy duty, industrial type machines. The present invention is an electronic system without moving parts which achieves the same object of providing reverse drive while being smaller, quieter, simple to use, and more reliable.

It is known in the art to provide an internal combustion engine which is capable of operation in either direction of rotation. It is also known to provide a means of reversing the direction of rotation, either when the engine is stationary or when it is operating. Some prior art devices rely on kickback of the motor during stalling conditions to provide the initial impetus in the reverse direction in order to achieve rotation in the reverse direction.

Generally speaking, there are two basic kinds of arrangements for altering the timing to permit rotation in the reverse direction. The first utilizes a rotary switch which is friction mounted on the drive shaft. When reversal is required, the ignition circuit is disconnected, causing the motor to decelerate. Upon stopping, kickback from the compression in the cylinder causes the engine to reverse rotate, in turn causing the friction mounted switch to toggle, engaging appropriate ignition and timing contacts for rotation in the opposite direction.

The other basic kind of arrangement provides for alteration of the spark advance by means of a "lost motion" mechanism in the timing shaft. Such a mechanism provides a certain amount of slippage in the timing shaft when the motor is turned in an opposite direction, sufficient to establish correct timing for the engine while running in the opposite direction. Canadian Patent 234,069 (Lanham) discloses a reversing mechanism for a 4-cylinder internal combustion engine which operates through a system of sliding gears to reverse the direction of the crank shaft without reversing the direction of the cam shaft and timing shaft. However, this system requires a complex arrangement of gears and furthermore cannot be reversed without first bringing it to a full stop and mechanically sliding a gear.

Canadian Patents 624,450 (Strang) and 594,571 (Rose) are related patents which provide a reversing lever to mechanically move the distributor housing to retard the spark sufficiently to kill the engine. A reverse starting switch is provided to start the motor in the opposite direction and timing is provided by a "lost motion" distributor shaft. Both of these systems rely upon mechanical movement of the distributor housing and a separate action on the part of the operator to commence reverse rotation.

U.S. Pat. No. 2,881,744 (Fox) illustrates a sliding switch type of reversal mechanism. When it is desired to reverse the engine, a switch is thrown disconnecting the ignition circuits. When the motor stops, compression remaining in the cylinder provides a kickback which rotates the rotor slightly in the reverse direction, causing the friction mounted switch on the crankshaft to move into engagement in the opposite direction such that the ignition is re-engaged and rotation commences in the opposite direction. This system relies upon a mechanical disposition of components as in the previous cases discussed.

U.S. Pat. No. 3,189,009 (Andersen) also uses a friction mounted rotary switch similar to U.S. Pat. No. 2,881,744 above. In this case, correct spark advance for each direction of rotation is provided by a separate set of breaker points and arm mounted against a cam on the rotor. These are electrically connected to the ignition system by the rotary switch, depending upon the direction of rotation. As in previous cases, this is a mechanical arrangement and furthermore does not provide a means for controlling the speed of the motor.

U.S. Pat. No. 3,981,278 (Harada) discloses a control system for controlling the operation of reversible marine engines. This system improves upon previous systems by providing circuits for sensing whether or not an engine is running and its speed if running, and by providing a restart delay when reversal is required until the engine speed is reduced to a safe level. However, this is a complex system designed for large marine engines and not readily applicable to small internal combustion engines.

Finally, U.S. Pat. No. 3,088,445 (Gardner) discloses a portable power driven tool which may be operated in either direction of rotation. Separate sets of magnetic pole pieces are located on the rotor in such a fashion that one pole piece in combination with a fixed magnetic means provides the spark in one direction of rotation while the other pair of pole pieces provides the spark with appropriate timing in the opposite direction. However, this patent does not provide for reversal of the motor while in operation, but instead requires the motor to be brought to a full stop and a mechanical starter applied to the motor in the desired direction of rotation to cause it to commence operation. Accordingly, this patent does not disclose a means of reversing the direction of rotation of the motor while it is operating.

From the above analysis, it may be seen that only Fox and Andersen disclose internal combustion engines which may be reversed in direction while operating. However, neither of these provides a simple non-mechanical method of so doing.

SUMMARY OF THE INVENTION

The present invention seeks to provide an improved system of engine reversal, which in addition to being mechanically simpler, is safer and allows for finer control of the operation.

The function of this new apparatus is to control ignition during both forward and reverse rotation and during reversal of rotation from one direction to the other. A microprocessor is utilized in order to achieve this objective.

Thus, according to one aspect of the invention there is provided a method of reversing the direction of rotation of a two-stroke, internal combustion engine provided with a spark ignition system, the engine having a piston that reciprocates in a cylinder and is connected to drive a rotary crankshaft, said method comprising inhibiting said spark ignition system when the engine is operating normally in a forward direction of rotation, whereby the speed of rotation of the engine crankshaft is continuously reduced, monitoring said speed of rotation and when it falls below a predetermined level and before it reaches zero, reactivating said ignition system to momentarily generate an ignition spark at an angle sufficiently in advance of top dead centre that the forces generated in the associated cylinder are high enough to reverse the direction of movement of the piston before it reaches the top dead centre position, whereby the direction of rotation of said crankshaft is reversed and immediately thereafter conditioning said ignition system to generate ignition sparks at a timed frequency that is conducive to operation of said engine in said reverse direction.

From another aspect, the invention provides a system for reversing the direction of rotation of a two-stroke, internal combustion engine provided with a spark ignition system, the engine having a piston that reciprocates in a cylinder and is connected to drive a rotary crankshaft, said method comprising:

inhibitor means selectively actuable for inhibiting said spark ignition system when the engine is operating normally in a forward direction of rotation, whereby the speed of rotation of the engine crankshaft is continuously reduced;

detector means for continuously monitoring said speed of rotation;

microprocessor means operable when the engine speed is below a predetermined level for reactivating said ignition system to momentarily generate an ignition spark at an angle sufficiently in advance of top dead centre that the forces generated in the associated cylinder are high enough to reverse the direction of movement of the piston before it reaches the top dead centre position, whereby the direction of rotation of said crankshaft is reversed; and ignition control means for conditioning said ignition system to generate ignition sparks at a timed frequency that is conducive to operation of said engine in said reverse direction.

BRIEF DESCRIPTION OF THE DRAWINGS

A preferred embodiment of the present invention will now be described in detail, by way of example only, with reference to the accompanying drawings, in which.

DESCRIPTION AND OPERATION

Figure 1:
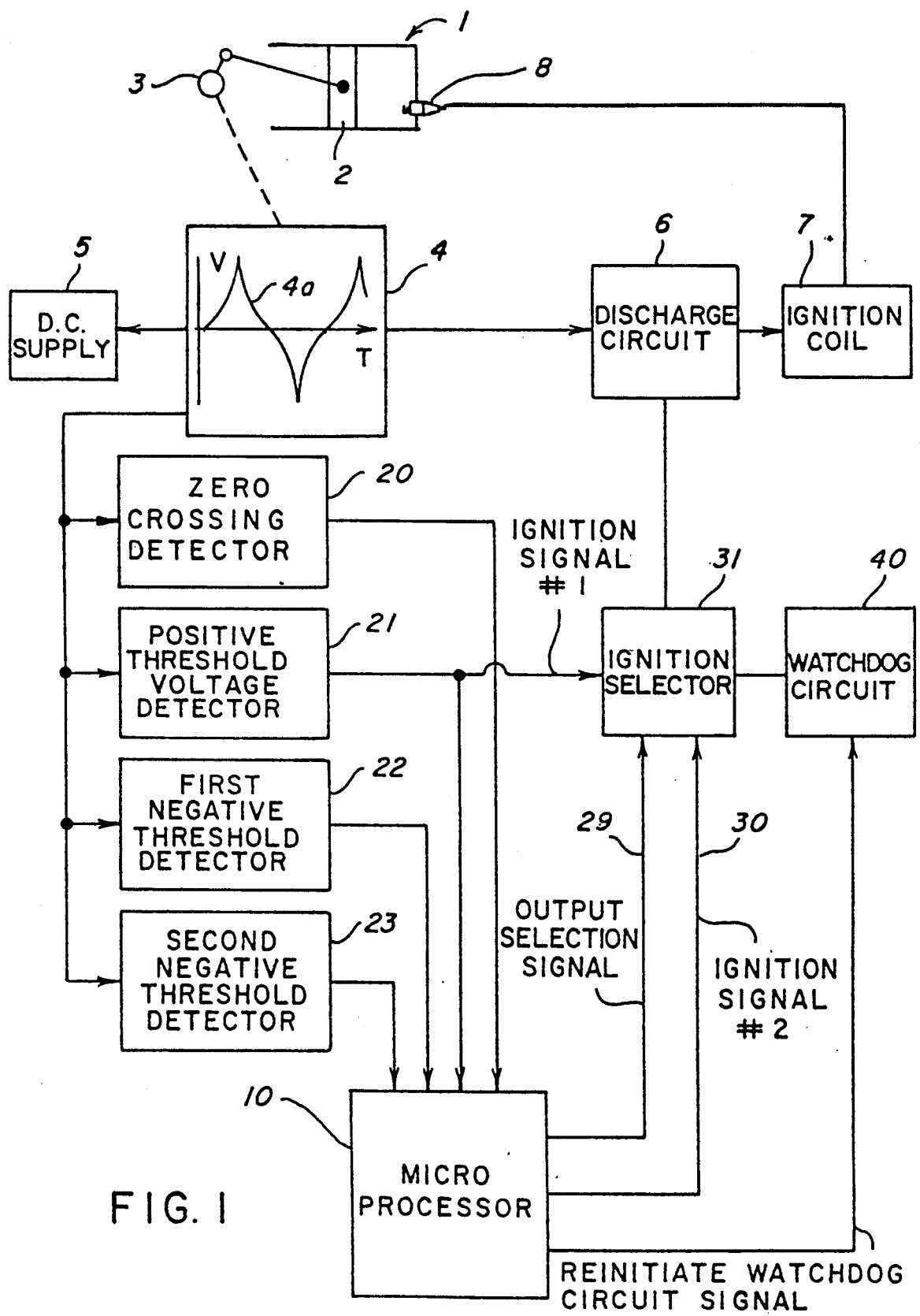
FIG. 1 is a schematic block diagram of the apparatus of the invention.

FIG. 1 shows a portion of a standard internal combustion ignition system. The internal combustion engine is schematically illustrated at 1 as a reciprocating piston 2 coupled to a crank shaft 3 in a known manner. A Magneto 4 has two generating coils: one is used for general electrical purposes (lighting, instrumentation, etc.) while the other is used specifically for the ignition system. Thus, magneto 4 is driven by the crank shaft and generates a voltage output 4a which powers the DC supply 5 of the engine reverse system. This voltage output is also applied to a capacitor charge and discharge circuit 6 which energises and ignition coil 7 that in turn powers a spark plug 8 to provide an ignition spark to the air-fuel mixture compressed in the cylinder, at an appropriate momment in the cycle of the engine. Magneto 4 is connected to the drive shaft of the engine in known fashion and generates its output voltage in timed relationship with the position of the crankshaft 3. This voltage output is then provided to the DC supply 5 of the engine reverse system to provide electric power requirements for the circuit.

A microprocessor 10 is used to control the ignition timing. In order to provide accurate ignition timing, the microprocessor 10 must be provided with information about the speed and position of the crankshaft at any given moment. This is done by a series of detectors that monitor the output of the magneto 4, specifically a zero-crossing detector 20, a positive threshold voltage detector 21, a first negative threshold detector 22 and second negative threshold detector 23, all of which are connected to the microprocessor 10.

The zero-crossing detector 20 and threshold voltage detectors 21, 22 and 23 all provide signals to the microprocessor when certain predetermined voltages are sensed. The microprocessor receives a signal from zero-crossing detector 20 when the magneto voltage output reaches zero. The microprocessor also receives signals from threshold detectors 21, 22 and 23 respectively when the magneto output voltage reaches a certain predetermined value in each case, typically +1 volt, −1 volt and −3 volts respectively.

The microprocessor 10 gives an output selection signal through a line 29 to an ignition selector 31, and an ignition signal through a line 30 to the ignition selector 31 which in turns provides a signal to control operation of the capacitor charge and discharge circuit 6. A watchdog or surveillance circuit 40 connected to the ignition selector 31 and to the microprocessor 10 monitors the performance of the circuit and is designed such that if the microprocessor does not perform a predetermined action in a repeated and regular manner, the watchdog circuit 40 causes the ignition signal selector 31 to inhibit all ignition signals to the ignition circuit, thus stopping the engine.

Figure 2:
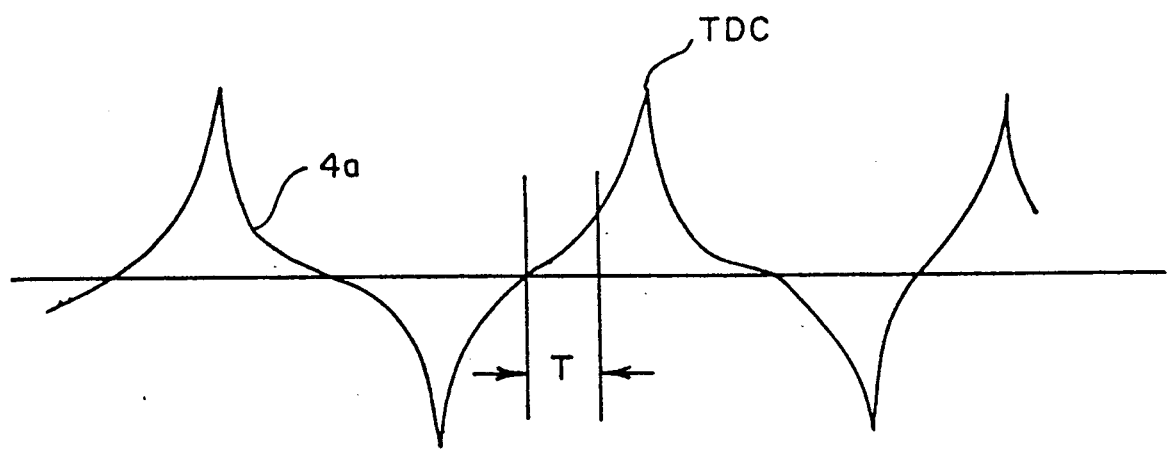
FIG. 2 is a graph of voltage output over time of a magneto in an internal combustion engine.

FIG. 2 illustrates the typical voltage output of a magneto of an internal combustion engine. Zero-crossing detector 20 in FIG. 1 detects the instant of zero crossing of voltage output 4a of the magneto. This signal is provided to the microprocessor 10 which is able to determine the speed of rotation of the engine by the elapsed time between successive zero-crossings detected by zero-crossing detector 20.

In normal operation in either the forward or reverse direction (when the engine is running at 3000 RPM or higher), the microprocessor receives signals from zero-crossing detector 20 and uses it as a signal reference. The microprocessor calculates a time delay in accordance with a predetermined relationship between rotational speed and direction of the engine and the spark advance which is built into the memory of the microprocessor. After this delay, a signal is sent via line 30 from the microprocessor to an ignition selector 31, which in ordinary operation, provides a path for the ignition signal through to the capacitor charge and discharge circuit 6 to energize the spark plug 8.

Voltage threshold detector 21 is used to generate the ignition signal when the engine is operating at low speed (lower than 3000 RPM) in the forward direction and voltage threshold detector 22 is used to generate the ignition signal when the engine is operating at low speed (lower than 3000 RPM) in the reverse direction.

In order to reverse the direction of rotation of the engine from forward to reverse, a signal is sent to the microprocessor by the operator by means of a switch (not shown). The microprocessor accordingly inhibits the ignition spark until the engine slows to a rate of rotation suitable for reversal, typically below about 500 rpm. The speed of rotation of the motor is monitored at all times by the microprocessor by means of the period of the signal arriving from the zero-crossing detector 20. When the motor speed has dropped to approximately 500 rpm, the microprocessor furnishes through line 30 an ignition signal at a timing corresponding to a spark advance of approximately 30° to 40° to the ignition signal selector 31 which in turn passes this signal to the ignition circuitry.

The voltage threshold detector 20 is used as a signal reference for the first spark having a large spark advance in the 10 engine reversing process. The large spark advance (30–40 degrees) is fine tuned by adding a time delay proportional to the engine RPM and to the delay requested. Because the signal reference from the threshold detector 20 occurs 40 degrees BTDC in forward direction, and 138 degrees BTDC on reverse direction, the delay is not the same when the engine is running in forward or reverse direction.

By providing an ignition spark at such a relatively high spark advance while the engine is operating at very low speed in this fashion, reversal of the engine can be effected. Essentially, the object is to provide early ignition in the engine cylinder so that the pressure of the combustion gases in the cylinder will be sufficient to overcome the momentum of the rotating engine parts and reverse the direction of movement of the piston before it reaches its top dead centre position, and thus reverse the direction of rotation of the crank shaft.

However, an attempt to reverse the engine rotation is not always successful. Sometimes, the rotational inertia may be larger than the kickback force. In that case, the engine continues to rotate in the same direction. Thus, the system needs a way to detect if the rotation has been reversed.

After the reversal sequence has been initiated from forward to reverse in the manner described above, the direction of rotation of the engine is monitored by the microprocessor through the signals arriving from zero-crossing detector 20 and positive threshold voltage detector 21. After attempting to reverse from forward to reverse, the arrival of signals at the microprocessor in chronological sequence from voltage threshold detector 20 and 21 respectively would indicate that the attempt was unsuccessful. If this sequence does not occur, the attempt is successful.

In the reversing process from reverse to forward, the arrival of signals at the microprocessor in chronological sequence from detectors 23 and 20 respectively would indicate that the attempt was unsuccessful. In addition the attempt will have been unsuccessful if there is no signal at all from detectors 23 and 20.

In order to indicate successful reversal, the chronological sequence of signals from detectors 20 and 23 must also be detected in less than a predetermined delay.

When unsuccessful, the correct timing (derived from detector 21 or 22 depending upon rotation direction) is reinitiated for 6 ignitions in order to accelerate the engine above the previous RPM level. Then, the reversal is again attempted. This method is valid for either rotation direction. Each successive attempt to reverse the rotation will be performed with modified reverse parameters: as a general guideline, the reverse RPM will be 50 RPM lower and/or the reverse timing will be more advanced by 2 degrees. These modified parameters will lower the rotation inertia and will increase the kickback force. The microprocessor will continue to attempt to initiate reversal in this fashion until such time as it detects that reversal has occurred.

Once rotation in the reverse direction is detected, signals from first negative threshold voltage detector 22 initially are used by the microprocessor to determine the timing of the spark up to a preselected speed of rotation (3,000 RPM). Once the engine has reached this predetermined speed, the microprocessor calculates the timing of the ignition signal applied to line 30 on the basis of signals received from zero-crossing detector 20 and calculations based upon the spark advance curve stored in memory in the microprocessor. When the engine is operating in the reverse direction, the period between two consecutive zero detect signals received from zero-crossing detector 20 is used to calculate the speed of the engine and time delay required for ignition.

Reversal of the engine direction from reverse to forward is accomplished in much the same fashion as above. When the microprocessor receives a signal to indicate that reversal is required, the spark is inhibited until the engine speed as indicated by the period of two consecutive zero detect signals received from detector 20 has been reduced to the required inversion speed of approximately 500 rpm. The spark is then advanced to the extent necessary to obtain reversal of the sense of rotation as described previously, and the engine monitored to determine whether or not the direction of rotation is changed. Signals from zero-crossing detector 20 and second negative voltage detector 23 are monitored by the microprocessor in order to verify the success of the reversal operation. If the engine has successfully changed direction, the spark advance is initially controlled in accordance with signals arriving from the positive voltage threshold detector 21 up to a predetermined speed of rotation (3,000 RPM). Thereafter, the spark advance is synchronized with the signals arriving from the zero-crossing detector 20 and the algorithms for the spark advance curve retained in memory of the microprocessor.

If the engine has not changed its sense of rotation to forward from reverse, correct timing is applied to the engine derived from detector 22 for a period of 6 ignitions. This is because the engine is still running in reverse. Thereafter the reversal sequence is reinitiated. This procedure will be repeated for as long as the engine has not changed its direction of rotation and has not stalled.

Accordingly, it will be seen from the foregoing that reversal of the engine is only attempted when the engine is rotating within a relatively narrow range of speeds.

After a request for reversal has been received, and while the engine is being slowed down to the speed necessary to initiate reversal, the request for reversal may be cancelled by the operator. In such a case, the microprocessor will simply allow the engine to resume normal operation.

As has been mentioned above, immediately after reversal and during start up conditions, the timing of the ignition signal cannot be derived in the normal manner due to the fact that the engine is accelerating at too high a rate. Because of the high acceleration during this period, the timing of each ignition signal cannot be predicted by an analysis of the timing of the previous ignition signals. Therefore, in this brief interval, the ignition signals are provided a fixed time after the voltage from the magneto has reached the positive voltage threshold (in the case of rotation in the forward direction) or the first negative voltage threshold (in the case of rotation in the reverse direction). These intervals are predetermined in such a fashion that they correspond to a spark advance of approximately 10°. Thus, during initial start up and during start up after reversal, a fixed spark advance of approximately 10° is provided until the motor has attained a minimum speed of 1,250 RPM.

In addition, during start up, ignition selector 31 is designed to function such that the ignition signal will be provided directly from the positive threshold voltage detector 21 for the first 9 revolutions until the power supply to the microprocessor has attained a nominal value. At start up there fore, the signal from the positive threshold voltage detector 21 is provided directly through the ignition signal selector 31 to the ignition circuitry without passing through the microprocessor.

When the voltage to the microprocessor has reached the nominal value, (after 9 engine revolutions), the microprocessor 10 takes over the function of generating the ignition signal via line 30 and activates the ignition signal selector preventing further direct generation of the ignition signal by the positive threshold voltage detector 21.

The watch dog or surveillance circuit 40 is used to prevent ignition generation when the microprocessor is faulty. The integrity of the microprocessor is checked by causing it to generate a continuous square wave under software control with precise specifications as to frequency and duty cycle. The watch dog or surveillance circuit evaluates this square wave and stops the ignition if the square wave does not match the specifications. Once activated, the watch dog circuit is locked so that the engine stops.

As a further safety precaution, the microprocessor is conditioned to limit the speed of rotation of the engine while in reverse and thus prevent operation of the vehicle at excessive speed in reverse.

For additional safety, the reversing process may only be activated when the engine R.P.M. is between 1000 and 4000 R.P.M. This is to prevent unintentional activation of the reverse process for any engine speed over the clutch engagement.

As well, at start up, if the reverse switch is in the reverse position, the engine starts in the forward direction, but the reverse process is not activated and the engine R.P.M. is limited to 2000 R.P.M. To reset the microprocessor for normal operation, the reverse switch must be placed on the forward position. Then, the R.P.M. is no longer limited to 2000 R.P.M., and any further switch activation will control the engine rotation direction.

As an alternative to the method of the proceeding paragraph, another way to safely start up the engine would be to kill the engine if the reverse switch is in the reverse position. The kill would be activated as soon as the microprocessor takes control of the ignition.

What I claim as my invention is:

1. A method of reversing the direction of rotation of a two-stroke, internal combustion engine provided with a spark ignition system, the engine having a piston that reciprocates in a cylinder and is connected to drive a rotary crankshaft, said method comprising:
    inhibiting said spark ignition system when the engine is operating normally in a forward direction of rotation, whereby the speed of rotation of the engine crankshaft is continuously reduced;
    monitoring said speed of rotation and when it falls below a predetermined level and before it reaches zero, initiating reversal by reactivating said ignition system to momentarily generate an ignition spark at an angle sufficiently in advance of top dead centre that the forces generated in the associated cylinder are high enough to reverse the direction of movement of the piston before it reaches the top dead centre position, whereby the direction of rotation of said crankshaft is reversed; and
    immediately thereafter conditioning said ignition system to generate ignition sparks at a timed frequency that is conducive to operation of said engine in said reverse direction.

2. The method of claim 1 wherein said ignition system is powered by a magneto, comprising monitoring said speed of rotation by measuring the time intervals between zero crossings of the voltage output of said magneto.

3. The method of claim 2 wherein during normal operation the ignition spark is generated at an angle in advance of top dead centre which is related to said speed of rotation in accordance with a predetermined relationship.

4. The method of claim 3 wherein when the said speed of rotation is increasing and is below a preselected speed, the ignition spark is generated at a predetermined angle in advance of top dead centre.

5. The method of claim 1 wherein the said angle in advance of top dead centre is between 30° and 40°.

6. The method of claim 1 wherein the predetermined level is approximately 500 rpm.

7. The method of claim 1 including the step of monitoring the direction of rotation after reversal of the engine has been attempted and if the direction of rotation of the engine has not been reversed, causing the engine to accelerate for a predetermined number of ignitions and re-initiating said reversal procedure.

8. The method of claim 7 wherein said predetermined number of ignitions is 6.

9. The method of claim 7 wherein after a failed attempt to reverse the engine has occurred, each successive attempt at reversal is performed at a lower engine speed and/or at a more greatly advanced timing.

10. The method of claim 9 wherein said lower engine speed is about 50 RPM lower, and said advanced timing is about 2 degrees more advanced.

11. The method of claim 1 wherein the speed of rotation of the engine in the reverse direction is limited so as not to exceed a predetermined level.

12. The method of claim 1 wherein the engine is stopped if the ignition system fails to function in a predetermined fashion.

13. The method of claim 1 wherein the method of reversing may only be activated when the engine speed is between 1000 RPM and 4000 RPM.

14. The method of claim 1 wherein attempting to start the engine in the reverse direction will cause the spark ignition system to be inhibited.

15. The method of claim 1 wherein attempting to start the engine in the reverse direction will cause the engine to start in the forward direction at a speed limited to 2000 RPM.

16. A system for reversing the direction of rotation of a two-stroke, internal combustion engine provided with a spark ignition system, the engine having a piston that reciprocates in a cylinder and is connected to drive a rotary crankshaft, said system comprising:
   inhibitor means selectively actuable for inhibiting said spark ignition system when the engine is operating normally in a forward direction of rotation, whereby the speed of rotation of the engine crankshaft is continuously reduced;
   detector means for continuously monitoring said speed of rotation;
   microprocessor means operable when the engine speed is below a predetermined level for reactivating said ignition system to momentarily generate an ignition spark at an angle sufficiently in advance of top dead centre that the forces generated in the associated cylinder are high enough to reverse the direction of movement of the piston before it reaches the top dead centre position, whereby the direction of rotation of said crankshaft is reversed; and
   ignition control means for conditioning said ignition system to generate ignition sparks at a timed frequency that is conducive to operation of said engine in said reverse direction.

17. The system of claim 16 wherein said ignition system is powered by a magneto and said detector means comprises a zero crossing detector that measures the time intervals between successive zero crossings of the voltage output of the engine magneto.

18. The system of claim 17 wherein said microprocessor is conditioned to generate the ignition spark generated at normal operating speeds at an angle in advance of top dead centre which is related to said speed of rotation in accordance with a predetermined relationship.

19. The system of claim 18 including an ignition signal selector circuit connected to deliver ignition signals from said microprocessor to the ignition circuit, a positive voltage threshold detector connected to monitor the voltage output of the magneto being connected to said ignition signal selector circuit, the latter being conditioned such that when the speed engine rotation is increasing but is still below a preselected speed, the ignition spark is timed from the signal of the positive voltage threshold detector to provide a spark at a fixed angle in advance of top dead centre.

20. The system of claim 16 wherein the said angle in advance of top dead centre is between 30° and 40°.

21. The system of claim 16 wherein the predetermined level is approximately 500 RPM.

22. The system of claim 16 wherein the microprocessor is conditioned to monitor the direction of rotation after reversal of the engine has been attempted and if the direction of rotation of the engine has not been reversed, causes the engine to accelerate for a predetermined number of ignitions and re-initiates said reversal procedure.

23. The system of claim 22 wherein said predetermined number of ignitions is 6.

24. The system of claim 22 wherein the microprocessor is conditioned such that after a failed attempt to reverse the engine has occurred, the microprocessor causes each successive attempt at reversal to be performed at a lower engine speed and/or at a more greatly advanced timing.

25. The system of claim 24 wherein said lower engine speed is about 50 RPM lower, and said advanced timing is about 2 degrees more advanced.

26. The system of claim 16 wherein the micro processor is conditioned to limit the speed of operation of the engine in reverse to a comparatively low level.

27. The system according to claim 16 including a monitoring circuit which monitors the performance of the ignition circuit and microprocessor and is adapted to terminate operation of said ignition circuit when any irregularity in the operation of these is detected.

28. The system of claim 16 wherein the microprocessor means is only operable for activating said system in order to reverse the direction of movement of the piston when the engine speed is between 1000 RPM and 4000 RPM.

29. The system of claim 16 wherein the inhibitor means includes a switch means selectively actuable between a forward position and a reverse position for controlling the microprocessor means to inhibit the spark ignition system if starting of the engine with the switch in the reverse position is attempted.

30. The system of claim 16 wherein the inhibitor means includes a switch means selectively actuable between a forward position and a reverse position for controlling the microprocessor means, such that if the engine is started with the switch means in the reverse direction, the microprocessor means causes the engine to rotate in the forward direction at a speed limited to 2000 RPM.

* * * * *